United States Patent [19]
Boniface et al.

[11] Patent Number: 5,105,088
[45] Date of Patent: Apr. 14, 1992

[54] CONSTANT SENSITIVITY SUPERHEATED DROPLET RADIATION DETECTOR/DOSIMETER

[75] Inventors: Hugh Boniface; Robert Noulty, both of Deep River; John Jevcak, Petawawa; Harry Ing, Deep River, all of Canada

[73] Assignee: Atomic Energy of Canada Limited, Ottawa, Canada

[21] Appl. No.: 519,587

[22] Filed: May 7, 1990

[30] Foreign Application Priority Data

May 18, 1989 [CA] Canada ................................ 601154

[51] Int. Cl.$^5$ .............................................. G01T 1/00
[52] U.S. Cl. ............................. 250/472.1; 250/473.1; 250/474.1
[58] Field of Search ................ 250/474.1, 473.1, 472.1

[56] References Cited

U.S. PATENT DOCUMENTS

| | | | |
|---|---|---|---|
| 3,405,266 | 10/1968 | Lode | 250/335 |
| 4,143,274 | 3/1979 | Apfel | 250/473.1 |
| 4,350,607 | 9/1982 | Apfel | 252/408.1 |
| 4,613,758 | 9/1986 | Ing et al. | 250/474.1 |
| 4,779,000 | 10/1988 | Ing | 250/474.1 |

OTHER PUBLICATIONS

V. I. Ivanov, N. N. Semashko, N. S. Smirnova and A. K. Salomatov, "Neutron Dosimetry with the Aid of Detectors Based on a Superheated Liquid," (Atomnaya Énergiya), vol. 63, No. 1 (Jul. 1987) pp. 58–60, Translated as Soviet Energy (U.S.A.), (1987) pp. 565–568 [©1988 Plenum Publishing Corporation].

*Primary Examiner*—Constantine Hannaher
*Attorney, Agent, or Firm*—Alan A. Thomson

[57] ABSTRACT

Radiation detectors and dosimeters having superheated droplets of detector liquid as the radiation-sensitive component have been found to have significant variation in sensitivity with changes in operating temperature. In order to provide a more constant sensitivity, a self-regulating pressure control has been developed which will alter the pressure on the droplet-containing medium to compensate for changes in operating temperature. The pressure control is for instance a mechanical system selected from a pressure-multiplying piston or bellows assembly pressurized by a volatile liquid, and a spring-loaded elastic diaphragm assembly. This pressure control is designed to maintain a constant degree of superheat of the detector liquid in activated detectors.

11 Claims, 5 Drawing Sheets

CONSTANT SENSITIVITY SUPERHEATED DROPLET RADIATION DETECTOR/DOSIMETER

FIELD OF THE INVENTION

Detection and measurement of radiation, such as neutron, gamma and microwave radiation, has been effected by observing vapourized droplets of superheated detector liquid in a suitable matrix. The operating temperature has been found to have a significant effect on sensitivity due to alterations in degree of superheat. It has been found possible to provide a more constant sensitivity by incorporating self-regulating pressure control means in the detector or dosimeter.

BACKGROUND AND PRIOR ART

In recent years versions of radiation detectors and dosimeters based on droplets of superheated detector liquid in a suspending medium, have been developed. Such detectors are described for instance, in U.S. Pat. No. 4,143,274, March 1979, Apfel; U.S. Pat. No. 4,350,607, September 1982, Apfel; U.S. Pat. No. 4,613,758, September 1986, Ing et al; and U.S. Pat. No. 4,779,000, October 1988, Ing. Similar detectors and dosimeters are also described in Soviet Atomic Energy (USA), Vol. 63, No. 1, pp. 565-8, July 1987, V. I. Ivanov et al.

As more experience is gained with this type of detector, it has become apparent that the sensitivity to radiation is affected significantly by variations in the operating temperature. It is desirable, for many applications where the temperature cannot be controlled, to have a known constant sensitivity. By constant sensitivity is meant a constant number of superheated droplets vapourized on exposure to a standard dose of radiation to be detected.

SUMMARY OF THE INVENTION

This invention is concerned with radiation detectors and dosimeters which use superheated droplets of detector liquid and which are compensated to render the sensitivity constant over a working temperature range.

One aspect of the invention concerns a method of providing constant sensitivity in the detection and measurement of radiation by the vapourization of superheated detector liquid droplets suspended in a medium subject to variations in operating temperature, comprising continuously altering the overpressure on the medium in concert with changes in operating temperature in a manner that will provide that the difference between the vapour pressure of the detector liquid Pvl and the overpressure on the medium Po, is constant.

Desirably the difference Pvl-Po is typically 400 kPa for neutron detectors and greater than 400 kPa, e.g. 800-900 kPa, for gamma and microwave detectors.

The invention includes a direct reading detector and dosimeter temperature compensated to have substantially constant sensitivity to selected radiation ranging from microwave and low Linear Energy Transfer (LET), up to high LET, radiation, comprising:

(a) discrete droplets of a high vapour pressure detector liquid dispersed in an elastic transparent or translucent solid medium or a viscous liquid or gel medium, said droplets having a sufficient degree of superheat to vapourize on exposure to said selected radiation or being under sufficient pressure to cancel this superheat, and (b) means to control the pressure on said droplet-containing medium, which means will alter the pressure in order to maintain a substantially constant value for the difference between the vapour pressure of the detector liquid droplets Pvl and the pressure on said medium Po, and thereby maintain a substantially constant sensitivity to said selected radiation with variations in operating temperature.

A self-regulating mechanical pressure control system may be used. For example the system desirably is selected from i) a pressure-multiplying piston or bellows assembly pressurized by a volatile liquid, and ii) a spring-loaded elastic diaphragm assembly.

The piston or bellows assembly may be pressurized at the low pressure end by a volatile liquid. The ratio of the working area of the larger piston or bellows to the smaller is selected, in conjunction with the choice of volatile liquid, to obtain the desired constant sensitivity.

Another aspect of the invention is a mechanical pressure regulating device comprising:

a) a closed chamber containing a volatile liquid, b) a pressure multiplying piston or bellows assembly, the larger piston or bellows interfacing with said chamber, c) a closed system able to be pressurized, and d) pressure-transmitting means connecting the smaller piston or bellows with said closed system.

Preferably the interface with said chamber and the connecting means with said closed system both comprise flexible diaphragms.

DETAILED DESCRIPTION

The basic detectors are fully described in the references given above.

Figure 1:
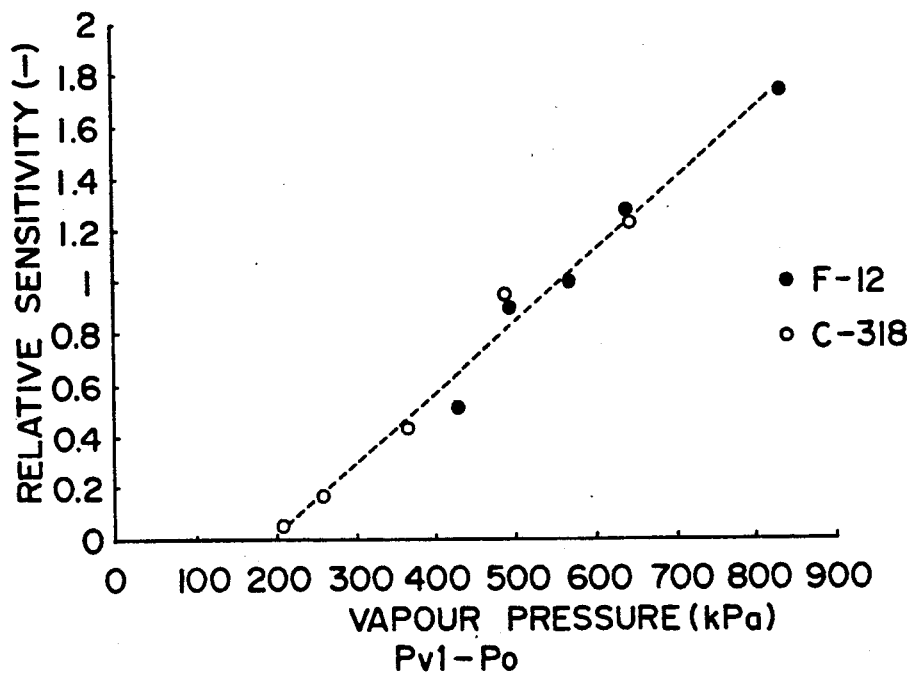
FIG. 1 is a graph showing variation in neutron sensitivity of a superheated droplet detector (relative to that for a standard neutron dose at 20° C.) with vapour pressure for two detector liquids Freon F-12 and C-318.

Our studies have shown that superheated droplet detector sensitivity to radiation is related to the pressure difference between the effective vapour pressure of the detector liquid droplets (Pvl) and the pressure over the detector matrix or medium (Po). In a typical detector where no attempt is made to apply temperature compensation, the external pressure on the detector matrix is normally atmospheric pressure. We have found that (within a limited temperature range) the detector sensitivity changes in direct proportion to the term Pvl-Po (see FIG. 1 where Po is constant at atmospheric). The term Pvl is fixed by the physical properties of the detector liquid, however Po (the external pressure or "overpressure") can be set arbitrarily. In FIG. 1, the relative sensitivity is the ratio of the response to neutrons at various temperatures to the same response at 20° C.

Given such a degree of freedom, the change in detector sensitivity with temperature can be nullified by making the external pressure applied to the detector matrix Po some appropriate function of temperature. This overpressure-temperature function must be such as to give a constant pressure difference between the overpressure and the vapour pressure (i.e. Pvl-Po is constant) over the detector working temperature range.

Preferred Constraints Placed on a Real Temperature Compensation System (a) For a typical neutron detector, a pressure difference (Pvl-Po) of about 400 kPa is suitable: for other forms of radiation of lower LET, higher pressure differences will be required, e.g. 750 for gamma, and 900 kPa for microwave.

(b) The operative compensation range is at least 15-35° C.

Compensation should be accurate within ± 25%.

(d) The compensation system should be small and reliable, and not require external power (preferably non-powered).

While typical values for Pvl-Po have been indicated, these are not critical: ranges of values for Pvl-Po could be used, e.g.

| for neutron radiation | 100-700 kPa |
| for gamma radiation | 700-1000 kPa |
| and for microwave radiation | 800-1000 kPa. |

Use of Vapour Phase/Condensed Phase Systems for Direct Overpressure Generation

Typical detector liquids now in use have normal boiling points in the −40 to +4° C. range; however, for a typical neutron detector to operate under the constraints listed above, the normal boiling point must be below −25° C. (in order to get at least 400 kPa vapour pressure at the lower temperature of 15° C.). Taking Freon G-115 (trademark for chloropentafluoroethane) as a typical detector liquid, it can be shown that the set of properties for a vapour phase/condensed phase system that would act as an over-pressuring system for Freon G-115 within the above constraints is defined by a vapour pressure of about 101 kPa at about −10° C. and an enthalpy of vapourization ($\Delta Hv$) of about 40 kJ/mol.

An extensive search of vapour phase/condensed phase systems has shown that such conditions do not exist in any vapour/liquid systems and could barely be approached in vapour/solid systems.

A number of possible alternative methods of passive temperature compensation can be proposed. In general terms, what is required is a physical system that alters its properties or state as some reversible function of temperature and the variation is sufficiently powerful and adaptable that it can be used to apply the appropriate overpressure to the detector matrix. This involves selecting the temperature sensitive system, then determining how it can be set up to apply the desired over-pressure-temperature function.

The preceding observations have indicated one temperature sensitive system which could be used (two phase vapour/liquid mixture) and have shown that some adaptation is required to provide the correct pressure-temperature function. A second system that might be used is the thermal expansion of solids or liquids (amplified as necessary). For instance, a mechanical spring having an appropriate spring constant associated with or responding to a material with an appropriate thermal expansion coefficient may be used. This latter material may comprise the filling liquid above the detector matrix. These types of systems are the basis of the present invention. Temperature compensation is used to mean application of the appropriate overpressure to the detector matrix so that the detector will show the same sensitivity to radiation over the compensation temperature range.

Figure 4:
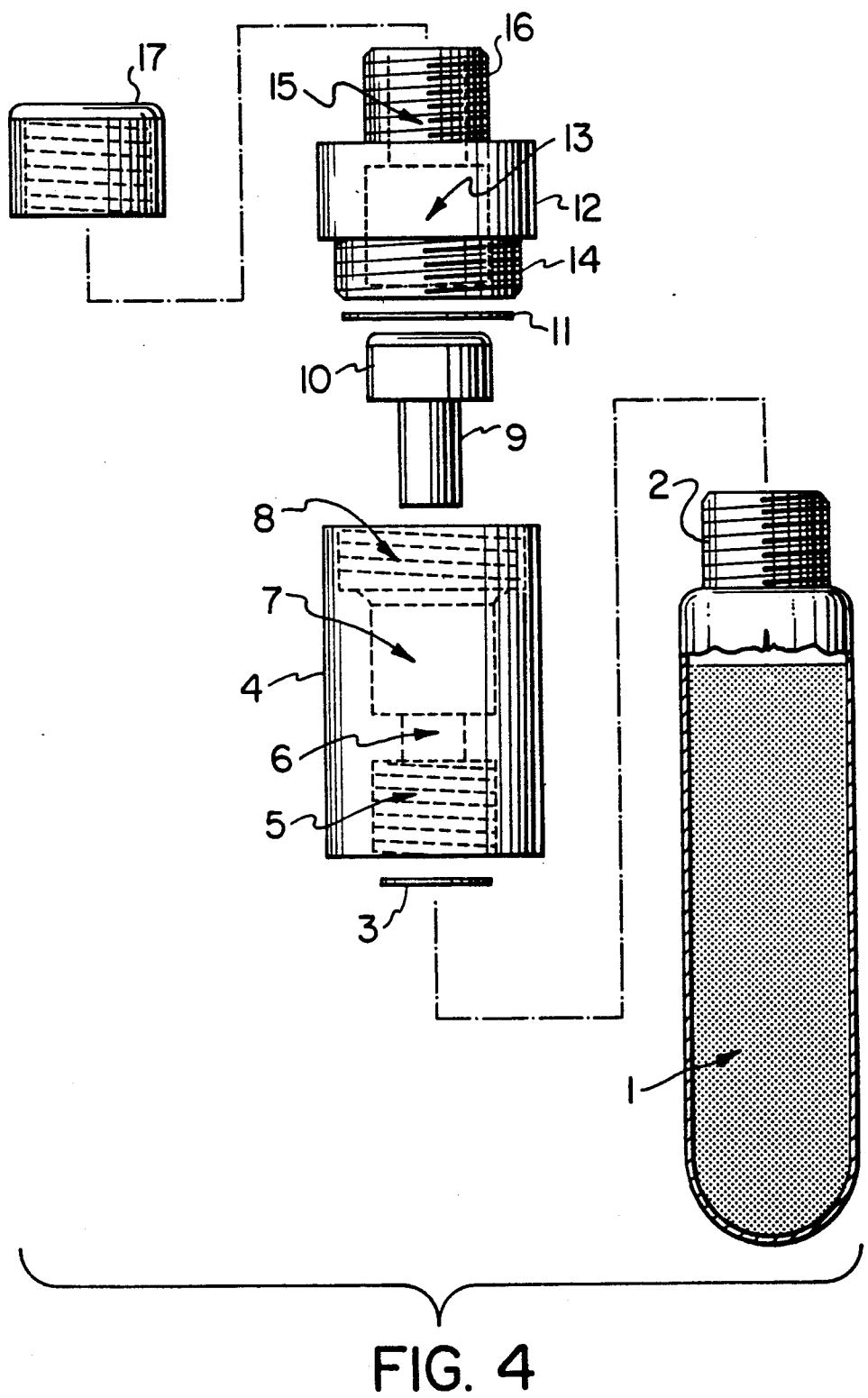
FIG. 4 is an exploded view of a compensated detector having pressure-multiplying pistons activated by a volatile overpressure liquid (Ex. 1).
Figure 5:
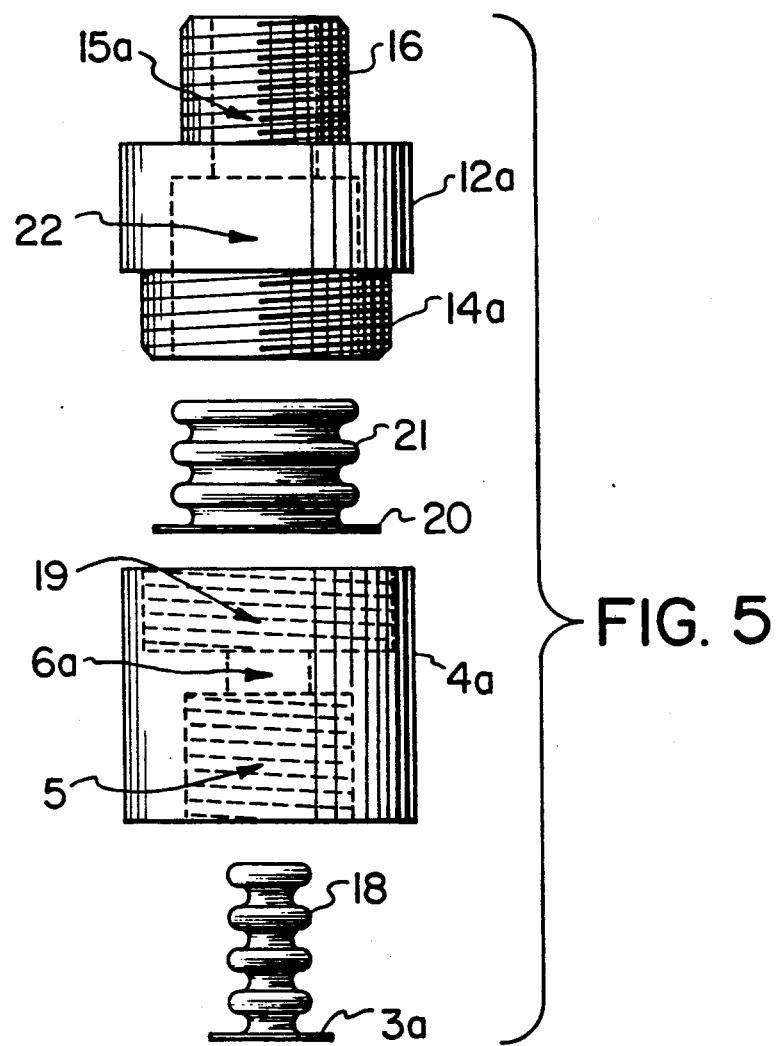
FIG. 5 is an exploded view of an alternative partial assembly in which pressure-multiplying bellows are substituted for the pistons in FIG. 4.
Figure 6:
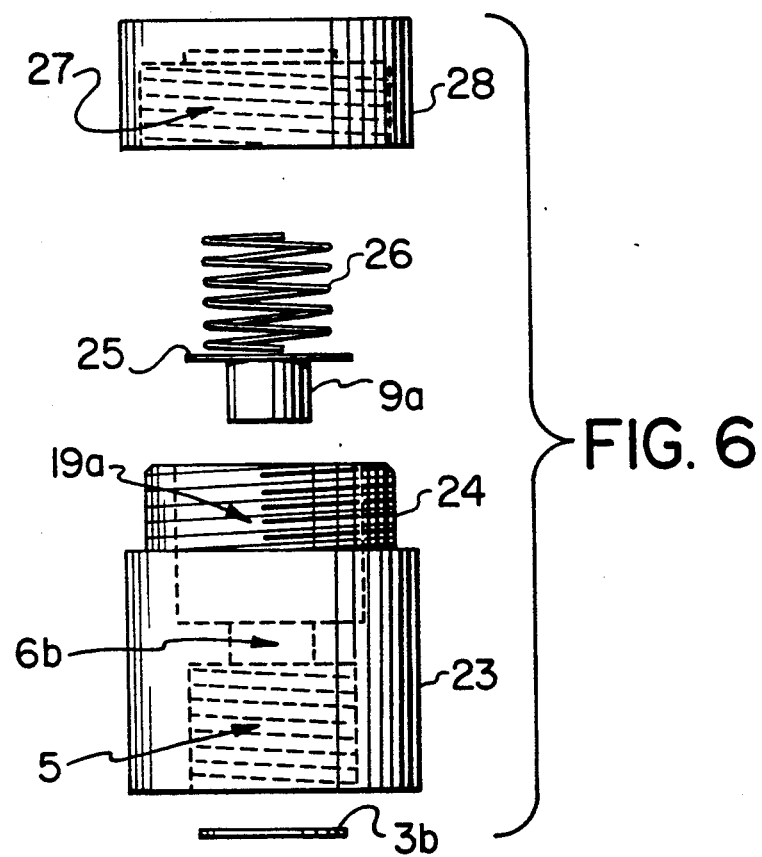
FIG. 6 is an exploded view of an alternative partial assembly in which a confined spring is used.

Three examples of suitable devices to accomplish the desired continuous pressure regulation are shown in FIGS. 4-6.

FIG. 4 is an exploded view of a detector with a pressure-multiplying piston assembly as in Example 1. The detector 1 (containing droplets dispersed in a suitable medium) has an open extension 2 (remote from the droplet-containing medium) adapted to seat against flexible elastic diaphragm 3 in chamber 5 in intermediate body 4. Body 4 contains passage 6 to accomodate travel of small piston 9 to contact diaphragm 3. Body 4 also contains chamber 7 adapted to receive large piston 10 and allow for piston movement therein. Opening 8 is sized to receive flexible diaphragm 11 and to mate with portion 14 of overpressure liquid container 12. Portion 14 has a chamber 13 sized to mate with part of large piston 10 via diaphragm 11. A suitable volatile liquid is introduced into chamber 15 (to a selected level) in container 12 via open extension 16: the latter is adapted to be sealed by cap 17.

The detector and pressure multiplying mechanism are assembled such that the volume above the detector medium (including extension 2 in FIG. 4) is filled up to diaphragm 3 with a suitable inert filling liquid such as water or various aqueous salt solutions, in order that the pressure variations be transmitted to the droplets of detector liquid.

In operation the vapour pressure of the volatile liquid in chamber 15 exerts pressure, through diaphragm 11, on large piston 10. The resultant force is transferred to diaphragm 3 through small piston 9. This force will produce a correspondingly greater pressure on the inert filling liquid portion of the detector and thus change the degree of superheat of the droplets.

FIG. 5 is an exploded view of an alternative to the piston assembly of FIG. 4, in which the large and small pistons are replaced by large and small pressure-transmitting bellows 21 and 18 respectively. These bellows have sealing flanges at 20 and 3a. Small bellows 18 is contained in body 4a within passage 6a and projects inside large bellows 21 (chamber 5 mates with extension 2 as in FIG. 4). Large bellows 21 is contained within chamber 22 of container 12a, the latter having portion 14a which mates with chamber 19 of body 4a. Chamber 15a of container 12a is adapted to contain a suitable volatile liquid and to be capped by cap 17 as in FIG. 4. In operation, the vapour pressure of the volatile liquid in 15a exerts varying pressure on the bellows 21 which transmits this force directly to small bellows 18. Small bellows 18 transmits the varying pressure directly to the detector via extension 2 and the inert filling liquid as before.

FIG. 6 is an exploded view of a spring-driven pressure-control assembly. Extension 2 seats against diaphragm 3b in chamber 5 in body 23. Passage 6b permits travel of member 9a which is attached to rigid plate 25. Chamber 19a contains the spring 26 and allows movement of plate 25 against the spring. Portion 24 of body 23 is adapted to mate with chamber 27 in body 28 to confine the spring. In operation, the spring exerts pressure on plate 25 and thus on member 9a. Thermal expansion of the contents of detector 1 will deflect spring 26 and thus change the pressure exerted by the spring on diaphragm 3b. This pressure is arranged to vary with temperature as required for compensation of detector sensitivity by selecting an appropriate inert filling liquid above the detector medium and appropriate spring constant.

Volatile overpressure liquids (e.g. for chamber 15 in FIG. 4) may be selected from octafluorocyclobutane (Freon C-318-trademark), 1,2-dichlorotetrafluoroethane (Freon 114-trademark), dichlorofluoromethane (Freon 21-trademark), dichlorodifluoromethane (Freon 12-trademark), chloropentafluoroethane (Freon G-115-trademark), ethyl chloride and pentane; others may also be used.

In the embodiments shown in FIGS. 4 and 5, suitable ratios of the working area of the large piston or bellows to that of the small may range from about 2 to about 8, but this range is not critical. A preferred range is about 2.5 to 3.5 with liquids of similar vapour pressure to ethyl chloride. Other possible combinations will be apparent to those skilled in the art, and the choice will take into account the vapour pressure of the detector liquid Pvl.

In the embodiment shown in FIG. 6, given a lower diaphragm 3b diameter of about 6 mm, the spring 26 may have a spring constant selected within the range, e.g. about 2000 to about 20000 N/m. Suitable materials for the spring include stainless steels. Suitable materials for the filling liquid include, for example, water, salt solutions, hexane, glycol, or ethyl ether. When the filling liquids are in direct contact with the detector medium, they should be inert and non-solvents with respect to this medium.

Those skilled in the art will appreciate from the above disclosure other alternatives and combinations which will function to provide the desired compensation.

The following Example is illustrative and should not be construed as limiting.

EXAMPLE 1-Temperature Compensation of Neutron Detectors

Figure 2:
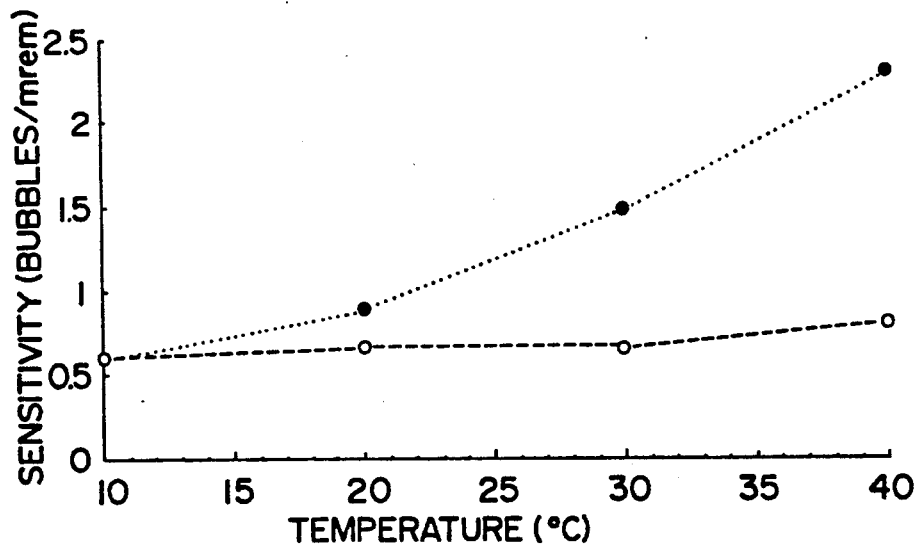
FIG. 2 is a graph depicting the change in sensitivity (droplets vapourized per millirem of radiation) with change in operating temperature for uncompensated (solid dots-prior art) and compensated (open circles-present invention) detectors.
Figure 3:
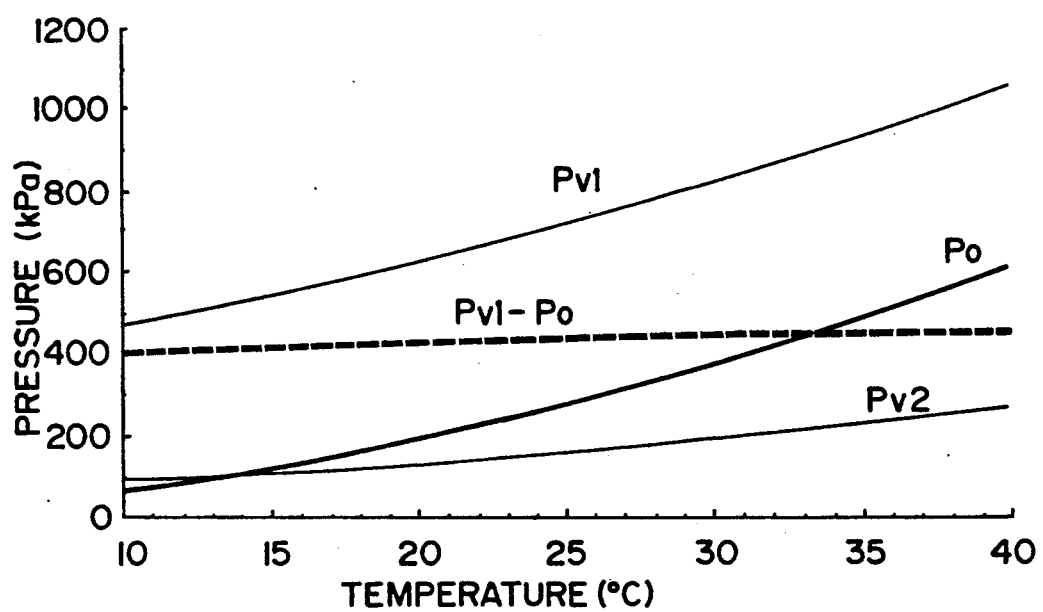
FIG. 3 is a graph illustrating the various pressures for a compensated detector (Ex. 1) as operating temperature changes, and showing that Pvl-Po remained constant.

Sensitivity vs temperature for a typical neutron detector is given in FIG. 2. Using a compensation assembly as shown in FIG. 4 with a piston area ratio of about 2.8 and the working liquid in chamber 15 being ethyl chloride (chloroethane) we obtained a sensitivity vs temperature that was essentially constant between 10° C. and 40° C. (see FIG. 2-open circles-dash line). When this is compared with the vapour pressure curves for the same system (FIG. 3) it can be seen that the results are exactly as desired, i.e. the resultant variable overpressure on the detector was sufficient to cancel the vapour pressure variation within the temperature range. Thus the piston assembly increased the overpressure Po above the Pv2 of the overpressuring liquid ethyl chloride, sufficiently to maintain Pvl (detector liquid)-Po (overpressure) constant (at about 400 kPa) over the desired range of temperature, in a self-regulating reliable manner.

In the embodiment of FIG. 4 used in this example, the actual dimensions and construction of the piston assembly was as follows.

The diameter of chamber 15 was 0.79 cm and length 2.05 cm, and extension 16 and cap 17 had mating screw threads. The diameter of chamber 13 (and chamber 7) and of piston 10 was 1.27 cm with the length of 13 being 0.48 cm. The diameter of piston 9 (and passage 6) was 0.64 cm and the combined length of 9 and 10 was 1.75 cm. The depth of opening 8 was 0.64 cm and of passage 6 0.64 cm. Body 4 (diameter 2.22 cm) was split into two parts which joined by mating threads. Portion 14 and opening 8 had mating screw threads as did extension 2 and chamber 5. The length of chamber 5 was 0.95 cm. Body 4 had four side openings which were used for recompression/reactivation of the detector without dismantling.

We claim:

1. A method of providing constant sensitivity in the detection and measurement of radiation by vapourization of superheated detector liquid droplets suspended in a medium subject to variations in operating temperature, comprising:
   continuously altering the overpressure on the medium Po in concert with changes in operating temperature in order to provide that the difference between the vapour pressure of the detector liquid Pvl and the overpressure on the medium Po, is maintained constant.

2. The method of claim 1 wherein the difference Pvl-Po is maintained constant within about 100 to about 700 kPa for neutron detection.

3. The method of claim 1 wherein the difference Pvl-Po is maintained constant within the range of about 700 to about 1000 kPa for gamma radiation detection, and within the range of about 800 to about 1000 kPa for microwave radiation detection.

4. A direct reading radiation detector and dosimeter temperature compensated to have substantially constant sensitivity to selected radiation ranging from microwave and low Linear Energy Transfer (LET), up to high LET, radiation, comprising:
   (a) discrete droplets of a high vapour pressure detector liquid dispersed in an elastic transparent or translucent solid medium or a viscous liquid or gel medium, said droplets having a sufficient degree of superheat to vapourize on exposure to said selected radiation or being under sufficient pressure to cancel this superheat, and
   (b) means to control the pressure on said droplet-containing medium, which means will alter the pressure in order to maintain a substantially constant value for Pvl-Po, where Pvl is the vapour pressure of the detector liquid droplets and Po is the pressure on said medium.

5. The detector and dosimeter of claim 4 wherein said means (b) comprises a self-regulating mechanical pressure-control system, and said medium is the elastic solid.

6. The detector and dosimeter of claim 5 wherein said mechanical pressure-control system is selected from
   i) a pressure-multiplying piston or bellows assembly pressurized by a volatile liquid, and
   ii) a spring-loaded elastic diaphragm assembly responding to thermal expansion of a filling liquid.

7. The detector and dosimeter of claim 6 wherein said piston or bellows assembly i) is pressurized at the low pressure end by a volatile liquid selected from the group consisting of: octafluorocyclobutane, 1,2-dichlorotetrafluoroethane, dichlorofluoromethane, dichlorodifluoromethane, ethyl chloride, and pentane.

8. The detector and dosimeter of claim 7 wherein the high pressure end of said assembly is connected to the detector and dosimeter through a sealed liquid-filled chamber having a pressure-transmitting diaphragm.

9. The detector and dosimeter of claim 8 wherein said assembly has two different sized pistons or bellows and the ratio of the working areas of each is selected, in conjunction with the choice of volatile liquid, to obtain the desired constant sensitivity.

10. The detector and dosimeter of claim 9 wherein said ratio is within the range of about 2 to 8.

11. The detector and dosimeter of claim 10 wherein two pistons having an area ratio of about 3 are used with the larger piston being pressurized by ethyl chloride.

* * * * *